United States Patent Office 3,210,442
Patented Oct. 5, 1965

1

3,210,442
POLYESTER RESINOUS COMPOSITIONS
Lennart A. Lundberg and Ivor H. Updegraff, Stamford,
Conn., assignors to American Cyanamid Company,
New York, N.Y., a corporation of Maine
No Drawing. Filed Aug. 7, 1961, Ser. No. 129,550
20 Claims. (Cl. 260—869)

This invention relates to novel, halogen-containing, thermosetting polyester resinous compositions, to products prepared therefrom, and to methods of producing such compositions and products. This invention further relates to novel, halogen-containing, thermosetting polyester resinous compositions which, when cured, provide thermoset polyester resins which are not only flame-retardant and self-extinguishing but which also exhibit improved resistance to photochemical decomposition, such as is caused by the ultraviolet light component of sunlight. More particularly, this invention relates to polyester resinous compositions comprising a reactive, essentially linear, ethylenically unsaturated polyester resin and an ethylenically unsaturated monomeric cross-linking material comprising (1) a vinyl ester of a 2 to 6 carbon atom-containing chlorinated saturated aliphatic monocarboxylic acid, said vinyl ester corresponding to the general formula:

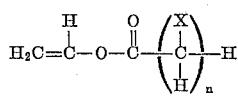

wherein X represents hydrogen or chlorine, with at least one of the total number of substituents represented by X being chlorine, and $n$ is an integer of from 1 to 5, inclusive, and (2) chloromethyl diallylphosphonate, which is represented by the structural formula:

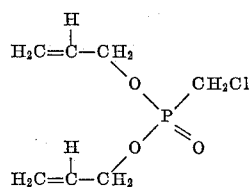

said cross-linking material being capable, under suitable reaction conditions, of copolymerizing with said reactive polyester resin to yield a complex, cross-linked thermoset resin which is characterized as being substantially insoluble and infusible.

The general class of thermosetting polyester resinous compositions and thermoset products derived therefrom with which the present invention is concerned is well known in the art. Said thermoset products have been generically described as substantially insoluble and infusible resinous reaction products resulting from the conjoint polymerization of an ethylenically unsaturated cross-linking material, generally one which comprises a major amount of an ethylenically unsaturated monomeric cross-linking agent containing a $CH_2=C<$ group, such as styrene, with a reactive, ethylenically unsaturated, essentially linear polyester resin, which is usually referred to as a reactive or polymerizable polyester resin. This reactive polyester resin is, in turn, usually obtained by condensing

2 an $\alpha,\beta$-ethylenically unsaturated polycarboxylic acid or anhydride, and particularly a dicarboxylic acid or anhydride such as maleic anhydride, with a polyol, generally a saturated dihydric alcohol such as ethylene glycol.

The many excellent properties possessed by conventional thermosetting polyester resinous compositions and the cured or thermoset polyester resins obtained therefrom have led to their widespread use in such diverse applications as laminates, adhesives, surface coatings and molded and cast articles, both filled and unfilled, and particularly in the first two fields stated. Nevertheless, there remains considerable room for improvement in certain properties of polyester resins which have heretofore limited their use in many important applications.

One such application is the preparation of flame-retardant, self-extinguishing articles, i.e., articles which, although they may burn when held in a strong flame, will either cease burning entirely or at least will not permit a flame to propagate and burn rapidly on the article itself once the externally applied flame is withdrawn. Such items as component parts for aircraft and missile assemblies, housings for electrical switching devices where sparks may be encountered, and structural members for building purposes, such as wall coverings, panels, pipes, electrical conduits, and the like, are among the many articles which can be laminated, bonded, coated, molded or cast using thermosetting polyester resinous compositions, provided one can achieve the degree of flame-retardance and self-extinguishability required by government or commercial specifications, by local and national building and fire regulations or codes, and by elementary safety considerations.

Unfortunately, conventional polyester resins of the type described hereinabove are realtively highly combustible materials, even when they are filled or reinforced with considerable amounts of non-combustible materials, as is the case in many commercial molded and laminated articles. This undesirable feature has prevented the use of such resins in many important areas where flame-retardance and self-extinguishability are required and, understandably, it has also induced those skilled in the art to make numerous attempts to impart flame-retardant and self-extinguishing properties to thermoset polyester resins.

For the most part, prior art attempts to provide flame-retardant and self-extinguishing thermoset polyester resins have involved the incorporation of various types of organic materials into conventional thermosetting polyester resinous compositions. A great deal of attention has been focused on the use of halogen-containing organic compounds for this purpose. In some cases, adequate flame-retardance and self-extinguisher ability have been sought by adding to thermosetting polyester resinous compositions halogen-containing compounds which are completely or largely chemically unreactive with the components of said compositions but which remain physically present in the thermoset resins after cure. In other cases, reactive halogen-containing organic compounds have been chemically incorporated into the thermoset resins themselves, e.g., by employing halogen-containing polycarboxylic acids and halogen-containing polyols in the preparation of the reactive polyester resins and through the use of halogen-containing cross-linking monomers. However, the art has found that both of these approaches to the problem, as practiced with the known prior art halogen-containing materials, give rise to additional decided disadvantages.

Thus, halogen-containing organic compounds which are melery physically present in the thermoset resin rather than chemically bound into its complex, cross-linked structure may be removed from the resin in a variety of ways, e.g., they may be leached out of the resin by the action of a solvent or driven off at sufficiently elevated temperatures.

Furthermore, an even more serious disadvantage, from the standpoint of retention of good product quality and appearance during use, is found in prior art thermoset polyester resins wherein halogen has been incorporated by either of the aforementioned methods, but especially in those cases involving reactive halogen-containing materials. Exposure to ultraviolet light, in some cases for only relatively short periods of time, produces markedly deleterious effects in such resins, and even the presence of ultraviolet light absorbers known to be effective in other resin systems, such as in unhalogenated polyester resins, does not satisfactorily minimize the pronounced yellowing and darkening of these halogenated resins as a result of such exposure. This is particularly true in those cases where the halogen content of the thermoset resins is largely or entirely derived from reactive polyester resins prepared from halogen-containing polycarboxylic acids or polyols, but it is also true with respect to a preponderance of the halogen-containing cross-linking monomers employed in prior art thermosetting polyester resinous compositions.

As a result of these finding, the prior art has attempted to develop means which would permit the utilization of chemically combined halogen in thermoset polyester resins for its flame-retardant and self-extinguishing properties but which would also minimize the susceptibility of such halogen-containing resins to ultraviolet attack.

It has been known for some time that the incorporation of phosphorus-containing compounds into thermosetting polyester resinous compositions wherein the reactive polyester resin component contains chemically bound halogen appears to have a synergistic effect on the halogen content's ability to impart flame-retardance and self-extinguishability to the ultimately produced thermoset resins. A more recent development in this area was the observation that thermoset polyester resins wherein both phosphorus and halogen were concurrently contained in the combined state in the form of a reaction product of a halogen-containing reactive polyester resin and a phosphorus-containing compound exhibited somewhat improved light stability, due to the fact that the presence of chemically bound phosphorus permitted the use of somewhat lesser amounts of halogen than would ordinarily be considered necessary. However, inasmuch as the combined halogen content of such resins was still largely or entirely derived from halogen-containing reactive polyester resins, the problem of inadequate light stability still remained to a large degree unsolved. Furthermore, those skilled in the art have generally continued to believe that the efficiency of any halogen-containing compound in imparting flame-retardant and self-extinguishing properties is directly proportional to the halogen content of the thermoset resin after cure whether or not said resin also contains bound or unbound phosphorus.

We have now discovered, quite unexpectedly, that thermoset polyester resins which have relatively low halogen contents and yet exhibit a degree of flame-retardance and self-extinguishability hitherto obtainable only from prior art polyester resins of significantly higher halogen content can be obtained by employing mixtures comprising a member of a particular class of vinyl esters of chorinated saturated aliphatic monocarboxylic acids together with chloromethyl diallylphosphonate as the ethylenically unsaturated monomeric cross-linking materials in thermosetting polyester resinous compositions. We have also discovered, again quite unexpectedly, that thermoset polyester resins prepared in this manner exhibit resistance to yellowing or darkening on exposure to ultraviolet light to an extent not found in prior art halogenated polyester resins having comparable flame-retardant and self-extinguishing properties.

It is, therefore, an object of our invention to provide novel, halogen-containing, thermosetting polyester resinous compositions.

It is also an object of our invention to utilize mixtures comprising particular vinyl esters of chlorinated saturated aliphatic monocarboxylic acids and particular chlorinated organic phosphorus compounds as novel polymerizable components of thermosetting polyester resinous compositions, wherein said mixtures serve as copolymerizates capable of imparting beneficial properties to the thermoset polyester resins prepared therefrom.

A further object of our invention is to provide novel, halogen-containing thermosetting polyester resinous compositions which, when cured, provide substantially insoluble and infusible flame-retardant and self-extinguishing thermoset polyester resins which exhibit improved resistance to yellowing or darkening on exposure to ultraviolet light.

These and other objects of our invention will be readily apparent to those skilled in the art, especially upon consideration of the detailed discussion and examples set forth hereinbelow.

The reactive polyester resins employed in the practice of the present invention are well known in the art. They are obtained by reacting mixtures of polycarboxylic acids, or their anhydrides, and polyhydric alcohols, wherein at least one of the reactive components of said mixtures contains $\alpha,\beta$-ethylenic unsaturation, to produce resinous, essentially linear esterification or condensation products containing a plurality of ethylenically unsaturated linkages distributed along the backbones of their polymer chains.

The use of $\alpha,\beta$-ethylenically unsaturated polycarboxylic acids provides a convenient method of introducing ethylenic unsaturation into the reactive polyester resins. We prefer to employ $\alpha,\beta$-ethylenically unsaturated dicarboxylic acids, such as maleic, fumaric, citraconic, $\gamma,\gamma$-dimethylcitraconic, mesaconic, itaconic, $\alpha$-methylitaconic, $\gamma$-methylitaconic, teraconic, and the like, as well as mixtures thereof, but we may also employ minor amounts of $\alpha,\beta$-ethylenically unsaturated polycarboxylic acids containing three or more carboxyl groups, such as aconitic acid and the like, together with the particular $\alpha,\beta$-ethylenically unsaturated dicarboxylic acid or acids chosen.

Similarly, non-polymerizable polycarboxylic acids, i.e., acids which are saturated or which contain only benzenoid unsaturation, such as oxalic, malonic, succinic, glutaric, adipic, pimelic, suberic, azelaic, sebacic, malic, tartaric, tricarballylic, citric, phthalic, isophthalic, terephthalic, cyclohexanedicarboxylic, endomethylenetetrahydrophthalic, and the like, as well as mixtures thereof, may also be employed, if used in combination with one or more of the aforementioned $\alpha,\beta$-ethylenically unsaturated polycarboxylic acids. The use of non-polymerizable polycarboxylic acids is oftentimes desirable, in that acids of this type may be employed to impart many beneficial properties to the thermoset polyester resins. For example, non-polymerizable polycarboxylic acids having only two carboxyl groups and no other reactive substituents may be employed to impart a desirable degree of flexibility which may not be achieved by the use of the $\alpha,\beta$-ethylenically unsaturated polycarboxylic acids alone. Where such non-polymerizable polycarboxylic acids are employed, the amount thereof should constitute at least about 20% but not more than about 80% of the total equivalents of carboxyl groups present in the esterification mixture. Preferably, such non-polymerizable polycarboxylic acids will be employed in amounts ranging from about 25% to about 75% of the total equivalents of carboxyl groups present in the esterification mixture.

Whenever available, the anhydrides of any of the aforementioned α,β-ethylenically unsaturated polycarboxylic acids and non-polymerizable polycarboxylic acids may be substituted for said acids in whole or in part.

Any of the large class of polyhydric alcohols ordinarily used in preparing reactive polyester resins may be employed for this purpose in the practice of the present invention. While dihydric alcohols, and especially saturated aliphatic diols, are preferred as coreactants in the preparation of the reactive polyester resins, it is not mandatory that all of the polyol used be of this type, in that small amounts, e.g., usually up to about 10% of the total equivalents of hydroxyl groups present in the esterification mixture, of polyols having more than two hydroxyl groups may also be employed. Among the dihydric alcohols which may be employed are saturated aliphatic diols such as ethylene glycol, propylene glycol, butylene glycol, diethylene glycol, dipropylene glycol, triethylene glycol, tetraethylene glycol, butanediol-1,2, butanediol-1,3, butanediol-1,4, pentanediol-1,2, pentanediol-1,3, pentanediol-1,4, pentanediol-1,5, hexanediol-1,2, hexanediol-1,3, hexanediol-1,4, hexanediol-1,5, hexanediol-1,6, neopentyl glycol, and the like, as well as mixtures thereof. Among the polyols having more than two hydroxyl groups which may be employed in minor amounts together with the above-mentioned diols are saturated aliphatic polyols such as glycerol, trimethylol ethane, trimethylol propane, pentaerythritol, dipentaerythritol, arabitol, xylitol, dulcitol, adonitol, sorbitol, mannitol, and the like, as well as mixtures thereof.

It is evident from the foregoing discussion that the coreactants used in preparing the reactive polyester resin component of our novel thermosetting polyester resinous compositions are preferably unhalogenated. However, certain of our novel compositions, e.g., those wherein component (1) of our novel mixture of chlorinated cross-linking monomers is a monochlorinated vinyl ester, such as vinyl monochloroacetate, or certain of those wherein, for economic reasons, component (1) has been replaced in part by a conventional unhalogenated monomeric cross-linking agent, may result in thermoset polyester resins whose halogen content imparts thereto somewhat less than the optimum degree of flame-retardant and self-extinguishing properties. In such cases, additional small amounts of halogen may, if desired, be incorporated by methods known in the prior art, e.g., by using minor amounts of halogenated polycarboxylic acids or polyols, e.g., amounts sufficient to introduce between about 5% and about 15%, and preferably between about 8% and about 10% by weight, based on the total weight of polymerizable reactants present, of additional combined halogen to the resulting thermoset polyester reisns, in preparing the reactive polyester resins. This can be done without seriously detracting from the light stability of the resulting thermoset resins since, first of all, the majority of their combined halogen will still be derived from the novel mixtures of chlorinated cross-linking materials of the present invention, and also because their total halogen content will still be significantly less than that of prior art thermoset resins having comparable flame-retardant and self-extinguishing properties.

Among the halogenated polycarboxylic acids that may be employed for this purpose are monochloro- and monobromomaleic, monochloro- and monobromofumaric, monochloro- and monobromomalonic, dichloro- and dibromomalonic, monochloro- and monobromosuccinic, α,β-dichloro- and dibromosuccinic, hexachloroendomethylenetetryhyrophthalic, and the like, as well as mixtures thereof. Whenever available, the anhydrides of any of these halogenated acids may be substituted therefor in whole or in part.

Among the halogenated polyols that may be employed for this purpose are 2,2'-chloromethylpropanediol-1,3, adducts of hexachlorocyclopentadiene with unsaturated polyols, such as butenediols, pentenediols, and the like, and adducts of hexachlorocyclopentadiene with polyols having three or more hydroxyl groups, one of which is etherified with an unsaturated alcohol reactive with hexachlorocyclopentadiene. Among the latter are compounds such as 3-[1,4,5,6,7,7-hexachlorobicyclo(2.2.1)-5-hepten-2-yloxy]-1,2-propanediol, which is the adduct of hexachlorocyclopentadiene with vinyl glycerol ether, 3-[1,4,5,6,7,7-hexachlorobicyclo(2.2.1)-5-hepten-2-yl] - methoxy-1,2-propanediol, which is the adduct of hexachlorocyclopentadiene with allyl glycerol ether, adducts of hexachlorocyclopentadiene with vinyl and allyl ethers of pentaerythritol, and the like. Mixtures of these halogenated polyols may also be employed, if desired.

The esterification mixtures from which the reactive polyester resins employed in the practice of the present invention are prepared are generally formulated so as to contain at least a stoichiometric balance between carbonyl and hydroxyl groups. Thus, where a diol and a dicarboxylic acid are employed, they are usually reacted on at least a mol to mol basis. In common commercial practice, which we prefer to follow, a small excess of polyol, usually in the range of from about 5% to about 15% excess, is employed. This is done primarily for economic reasons, e.g., to insure a rapid rate of esterification.

The reactive polyester resins used in the practice of the present invention are formed in the manner customarily observed in the art. Thus, the particular polycarboxylic acid or acids and polyol or polyols employed are reacted at elevated temperatures and atmospheric pressure. Since resinifying reactants of this type are prone to develop undesirable color when in contact with air at elevated temperatures, it is generally considered good practice to conduct the esterification reaction in an inert atmosphere, such as can be obtained by bubbling an inert gas, e.g., carbon dioxide, nitrogen, and the like, through the esterification mixture. The reaction temperature is not critical, thus, the reaction will preferably be carried out at a temperature which usually will be just below the boiling point of the most volatile component of the reaction mixture, generally the polyol. However, temperatures in excess of the boiling point of the most volatile component may be employed if the reaction vessel is equipped with suitable condensing means, such as a steam-heated reflux condenser, which will permit water of esterification to escape from the reaction vessel while condensing volatilized reaction components and returning them to the reaction sphere. Similarly, pressures slightly above or below atmospheric pressure may be employed if desired.

The esterification mixture should be sufficiently reacted so as to ultimately produce a reactive polyester resin having an acid number not appreciably more than about 75. We prefer to employ reactive polyester resins having acid numbers ranging from about 30 to about 50. Further details pertaining the preparation of reactive polyester resins of the type employed in the practice of the present invention are disclosed in U.S. Patent No. 2,255,313, to Ellis, and in U.S. Patents Nos. 2,443,735 to 2,443,741, inclusive, to Kropa.

The ethylenically unsaturated monomeric cross-linking materials in our novel, halogen-containing thermosetting polyester resinous compositions are, as previously indicated, mixtures comprising two essential components. The first of these is a vinyl ester of a 2 to 6 carbon atom-containing chlorinated saturated aliphatic monocarboxylic acid, and corresponds to the general formula:

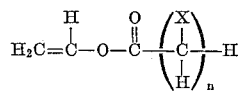

where X represents hydrogen or chlorine, with at least one of the total number of substituents represented by X being chlorine, and $n$ is an integer of from 1 to 5, inclusive. An illustrative but by no means exhaustive listing of chlorine-containing vinyl esters falling within this classification includes vinyl monochloroacetate,
vinyl $\alpha$-monochloropropionate,
vinyl $\beta$-monochloropropionate,
vinyl $\alpha,\beta$-dichloropropionate,
vinyl $\alpha$-monochlorobutyrate,
vinyl $\beta$-monochlorobutyrate,
vinyl $\gamma$-monochlorobutyrate,
vinyl $\alpha,\beta$-dichlorobutyrate,
vinyl $\alpha,\gamma$-dichlorobutyrate,
vinyl $\beta,\gamma$-dichlorobutyrate,
vinyl $\alpha,\beta,\gamma$-trichlorobutyrate,
vinyl $\alpha$-monochlorovalerate,
vinyl $\beta$-monochlorovalerate,
vinyl $\gamma$-monochlorovalerate,
vinyl $\delta$-monochlorovalerate,
vinyl $\alpha,\delta$-dichlorovalerate,
vinyl $\alpha$-monochlorocaproate,
vinyl $\beta$-monochlorocaproate,
vinyl $\gamma$-monochlorocaproate,
vinyl $\delta$-monochlorocaproate,
vinyl $\epsilon$-monochlorocaproate,
vinyl $\alpha,\epsilon$-dichlorocaproate, and the like, as well as mixtures thereof.

One convenient method of preparing these chlorine-containing vinyl esters involves reacting the corresponding free acid, e.g., monochloroacetic acid, with acetylene in the presence of a mercuric salt, e.g., mercuric oxide. Further details regarding this method are disclosed in the copending application of John Phillip Paré and Edwin Marvin Smolin, Serial No. 115,464, filed June 7, 1961.

The second essential component of our ethylenically unsaturated monomeric cross-linking materials is chloromethyl diallylphosphonate, the preparation of which is disclosed in U.S. Patent No. 2,714,100, to Fon Toy et al.

Each of the essential components of our cross-linking materials is present in specific amounts. Thus, the amount of chlorine-containing vinyl ester which will be present will be at least about 20% by weight, and may be as much as about 50% by weight, based on the weight of the reactive polyester resin, if no cross-linking monomer other than chloromethyl diallylphosphonate is employed therewith. However, as previously indicated, in certain cases it will be desirable to replace part of the chlorine-containing vinyl ester with minor amounts of a different polymerizable, ethylenically unsaturated, monomeric cross-linking agent containing a $CH_2=C<$ group, preferably one having a boiling point, at atmospheric pressure, of 60° C. or greater.

Among such polymerizable compounds there are included styrene, side chain-substituted styrenes such as $\alpha$-methylstyrene, $\alpha$-ethylstyrene, and the like, ring-substituted styrenes, such as the alkylstyrenes, e.g., ortho-, meta- and para-alkylstyrenes such as o-methylstyrene, p-ethylstyrene, m-propylstyrene, 2,4-dimethylstyrene, 2,5-diethylstyrene, and the like. In addition, one may also use aliphatic vinyl esters such as the alkyl esters of acrylic and methacrylic acid, e.g., methyl, ethyl, or butyl acrylate, methyl methacrylate, and the like, vinyl acetate, vinyl butyrate, vinyl laurate, acrylonitrile, methacrylonitrile, and the like. Further, acrylamide, methacrylamide, and their derivatives also may be employed. Still further, one can make use of the allyl compounds such as diallyl phthalate, allyl acetate, allyl methacrylate, diallyl carbonate, allyl lactate, allyl $\alpha$-hydroxyisobutyrate, allyl acrylate, diallyl malonate, diallyl oxalate, diallyl gluconate, diallyl methyl gluconate, diallyl adipate, diallyl sebacate, diallyl tartronate, diallyl tartrate, diallyl mesaconate, diallyl citraconate, the diallyl ester of muconic acid, diallyl itaconate, the diallyl ester of endomethylenetetrahydrophthalic anhydride, triallyl tricarballylate, triallyltrimesate, triallyl aconitate, triallyl cyanurate, triallyl citrate, triallyl phosphate, trimethallyl phosphate, tetraallyl silane, tetraallyl silicate, hexallyl disiloxane and the like. These polymerizable, ethylenically unsaturated monomeric cross-linking agents may be used singly or in combination with one another, and when employed to replace part of the chlorine-containing vinyl ester content of our cross-linking monomers they will be present in amounts ranging from about 5% to about 50% by weight, based on the weight of said chlorine-containing vinyl ester.

The chloromethyl diallylphosphonate will be present in an amount sufficient to result in at least about 0.6% by weight of combined phosphorus being present in the ultimately produced thermoset polyester resins or, in other words, in amounts ranging from about 5% to about 10% by weight, based on the total weight of polymerizable reactants present in the thermosetting polyester resinous composition.

In order to facilitate the copolymerization of the ethylenically unsaturated monomeric cross-linking material with the reactive polyester resin, it is preferred that a polymerization catalyst be present in the thermosetting polyester resinous composition at the time of its cure. The types and amounts of these catalytic materals which may be used are well known in the art, and any material which normally induces polymerization of conventional polyester resinous compositions can be utilized in the practice of the present invention. The optimum curing conditions are modified to some extent by the choice of the particular catalyst, and the amount thereof, to be used. A very active catalyst should be used in lower concentrations, and preferably at lower temperatures, than a less reactive material, but in general, the amount of polymerization catalyst, e.g., organic superoxide, that will be employed will generally range from about 0.5% to about 2% by weight, based on the total weight of polymerizable reactants present in the thermosetting polyester resinous composition. The preferred catalysts comprise a wide variety of organic peroxides ("acidic peroxides") and hydroperoxides ("alcoholic peroxides") which are generically described as organic superoxides. Among the organic peroxide catalysts that may be employed are such as acetyl peroxide, benzoyl peroxide, substituted benzoyl peroxides, and particularly halogenated benzoyl peroxides such as p-bromobenzoyl peroxide, 2,4-dichlorobenzoyl peroxide, etc., benzoyl acetyl peroxide, phthallyl peroxide, succinyl peroxide, fatty oil acid peroxides, such as cocoanut oil peroxide, lauryl peroxide, stearyl peroxide, oleyl peroxide, anisoyl peroxide, toluyl peroxide, and the like. Organic peracids, such as peracetic acid and perbenzoic acid, may also be employed. Among the organic hydroperoxide catalysts that may be employed are such as tertiary butyl hydroperoxide, cumene hydroperoxide, diisopropyl benzene hydroperoxide, 1-hydroxycyclohexyl hydroperoxide, the terpene oxides, such as ascaridole, 1-p-menthane hydroperoxide, etc., and the like. Mixtures of peroxides and hydroperoxides, including commercially available mixtures such as methyl ethyl ketone peroxide, cyclohexane peroxide, and the like, are especially effective as catalysts. Various other types of polymerization catalysts may also be employed, for example, compounds such as aluminum chloride, stannic chloride, boron trifluoride, or the azo-type catalysts such as $\alpha,\alpha'$-azobisisobutyronitrile.

Since the reactive polyester resin components of our novel, halogen-containing thermosetting polyester resinous compositions contain a high degree of polymerizable unsaturation, it is often desirable to incorporate a polymerization inhibitor therewith. The inhibitor, i.e., a material which will impart some measure of stability to the polymerizable mixture during any storage period encountered prior to curing and yet not affect the polymerization reaction once it has been initiated by the addition of catalyst or by heating, will be employed in amounts ranging from about 0.005% to about 0.1% by weight, based on the total weight of polymerizable, reactive components present in the thermosetting polyester resinous composition. Among the inhibitors that may be used are such materials as phenol, the monoalkyl phenols, such as ortho-, meta- and para-cresol, as well as mixtures of such isomers, polyalkyl phenols having a plurality of the same or different substituents, e.g., ethyl, propyl, butyl and higher alkyl radicals, attached to their nuclei, catechol, tertiary butyl catechol, hydroquinone, tertiary butyl hydroquinone, resorcinol, eugenol, guaiacol, pyrogallol, benzaldehyde, tannic acid, ascorbic acid, isoascorbic acid, phenylene diamine, sym-di-β-naphthyl-p-phenylene diamine, aniline, and the like. The inhibitor is generally incorporated into the thermosetting polyester resinous composition at the time the reactive polyester resin is dissolved in the monomeric cross-linking material. However, the inhibitor, and particularly inhibitors such as hydroquinone and tertiary butyl catechol, may also be advantageously present during the preparation of the reactive polyester resin itself.

As previously indicated, thermoset polyester resins prepared using our novel mixtures of chlorinated cross-linking materials exhibit greatly improved resistance to yellowing on exposure to ultraviolet light when compared under the same conditions with prior art halogenated polyester resins having comparable flame-retardant and self-extinguishing properties. This is undoubtedly due, at least in part, to the fact that in all cases the total halogen content of thermoset polyester resins prepared according to the practice of the present invention is significantly less than that of said prior art halogenated resins, even when minor amounts of halogenated polycarboxylic acids or halogenated polyols have been incorporated into our resins to provide an optimum degree of flame-retardancy and self-extinguishability. Nevertheless, for certain commercial applications wherein ultraviolet light absorbency is a factor, in that flame-retardant and self-extinguishable thermoset polyester resins employed therein are required to maintain a clear, water-white appearance together with a high degree of transparency or translucence for extended periods of time, it will be desirable to incorporate a minor amount of a conventional ultraviolet light-absorbing compound, i.e., an amount ranging from about 0.25% to about 1% by weight, based on the total weight of polymerizable reactive components present in the thermosetting polyester resinous composition, into said composition prior to final cure. Understandably, this is especially desirable where a part of the polycarboxylic acid or polyol reactant used in preparing the reactive polyester resin is a halogen-containing material, such as hexachloroendomethylenetetrahydrophthalic anhydride or a hexachlorocyclopentadiene-polyol adduct.

Any of a wide variety of materials which are known to act as ultraviolet light absorbers in prior art resins may be employed for this purpose in the practice of the present invention, and thus, the use of a particular material or class of materials is not critical. However, one class of materials which has proven especially useful for this purpose and which, therefore, is preferred for use in our novel, halogen-containing thermosetting polyesters resinous compositions encompasses substituted benzophenones represented by the general formula:

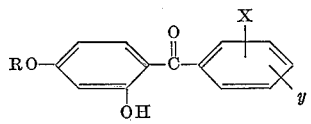

wherein R represents a lower alkyl group having from 1 to 4 carbon atoms, inclusive, X represents a hydrogen atom, a halogen atom, i.e., fluorine, chlorine, bromine or iodine, a lower alkyl group having from 1 to 4 carbon atoms, inclusive, or a lower alkoxy group having from 1 to 4 carbon atoms, inclusive, and $y$ represents a hydrogen atom, a halogen atom, i.e., fluorine, chlorine, bromine or iodine, a hydroxy group, a lower alkyl group having from 1 to 4 carbon atoms, inclusive, or a lower alkoxy group having from 1 to 4 carbon atoms, inclusive.

An illustrative but by no means exhaustive listing of substituted benzophenones falling within this classification includes 2,2'-dihydroxy-4,4'-dimethoxybenzophenone;
2,2'-dihydroxy-4,4'-diethoxybenzophenone;
2,2'-dihydroxy-4,4'-dibutoxybenzophenone;
2,2'-dihydroxy-4-methoxy-4'-ethoxybenzophenone;
2,2'-dihydroxy-4-methoxy-4'-propoxybenzophenone;
2,2'-dihydroxy-4-methoxy-4'-butoxybenzophenone;
2,2'-dihydroxy-4-ethoxy-4'-propoxybenzophenone;
2,2'-dihydroxy-4-ethoxy-4'-butoxybenzophenone;
2,3'-dihydroxy-4,4'-dimethoxybenzophenone;
2,3'-dihydroxy-4-methoxy-4'-butoxybenzophenone;
2-hydroxy-4,4',5'-trimethoxybenzophenone;
2-hydroxy-4,4',6'-tributoxybenzophenone;
2-hydroxy-4-butoxy-4,5'-dimethoxybenzophenone;
2-hydroxy-4-ethoxy-2',4'-dibutylbenzophenone;
2-hydroxy-4-propoxy-4',6'-dichlorobenzophenone;
2-hydroxy-4-propoxy-4',6'-dibromobenzophenone;
2-hydroxy-4-methoxybenzophenone;
2-hydroxy-4-ethoxybenzophenone;
2-hydroxy-4-propoxybenzophenone;
2-hydroxy-4-butoxybenzophenone;
2-hydroxy-4-methoxy-4'-methylbenzophenone;
2-hydroxy-4-methoxy-4'-ethylbenzophenone;
2-hydroxy-4-methoxy-4'-butylbenzophenone;
2-hydroxy-4-methoxy-4'-chlorobenzophenone;
2-hydroxy-4-methoxy-4'-bromobenzophenone;
2-hydroxy-4,4'-dimethoxybenzophenone;
2-hydroxy-4,4'-dimethoxy-3-methylbenzophenone;
2-hydroxy-4,4'-dimethoxy-2'-ethylbenzophenone;
2-hydroxy-4,4',5'-trimethoxybenzophenone;
2-hydroxy-4-ethoxy-4'-methylbenzophenone;
2-hydroxy-4-ethoxy-4'-ethylbenzophenone;
2-hydroxy-4-ethoxy-4'-propylbenzophenone;
2-hydroxy-4-ethoxy-4'-butylbenzophenone;
2-hydroxy-4-ethoxy-4'-methoxybenzophenone;
2-hydroxy-4,4'-diethoxybenzophenone;
2-hydroxy-4-ethoxy-4'-propoxybenzophenone;
2-hydroxy-4-ethoxy-4'-butoxybenzophenone;
2-hydroxy-4-ethoxy-4'-chlorobenzophenone;
2-hydroxy-4-ethoxy-4'-bromobenzophenone, and the like, as well as those compounds wherein fluorine or iodine has been substituted for chlorine or bromine in any of the compounds listed hereinabove.

Further examples of ultraviolet light-absorbing compounds which may be employed in the practice of the present invention are given in U.S. Patents Nos. 2,693,492, to Hoch; 2,777,828, to Day et al.; 2,937,157, to Clark, and 2,853,521 and 2,962,533, to Hardy et al., each of which is incorporated herein by reference.

The curing conditions necessary to advance our novel, halogen-containing thermosetting polyester resinous compositions to the thermoset state, i.e., to the state of substantial insolubility and infusibility, do not differ from those followed in the prior art in curing conventional thermosetting polyester resinous compositions. Thus, curing may be effected at temperatures ranging from about 10° C. to about 160° C., or even higher, either in contact with air or enclosed in a laminating assembly, mold, or the like, as long as the temperature is held below the point at which the compositions being cured begin to decompose. Preferably, these catalyzed, resin-forming masses will be cured by heating them to between about 90° C. and about 150° C. in enclosed molds or presses for periods of time ranging from about 2 minutes to about 90 minutes.

As indicated hereinabove, the novel, halogen-containing, thermosetting polyester resinous compositions of the present invention are especially suited for use in laminating, in the preparation of adhesives, in molding, and in the preparation of surface coatings and castings, especially where flame-retardance, self-extinguishability and good light stability are required. Conventional laminating and molding procedures will be employed, and both filled and unfilled castings are also prepared from these compositions in the conventional manner. Besides curing catalysts, polymerization inhibitors, ultraviolet light-absorbing compounds and conventional fillers and reinforcements, such as glass fibers, either in woven form, e.g., glass cloth, or in the form of discreet particles, such as chopped fibers or chopped glass cloth, other known additives, such as catalyst promoters, mold lubricants, flow promoters, pigments, dyes and the like may also be incorporated prior to final cure.

In order that those skilled in the art may more fully understand the inventive concept presented herein, the following examples are set forth. These examples are given solely by way of illustration, and should not be considered as expressing limitations unless set set forth in the appended claims. All parts and percentages are by weight, unless otherwise stated.

PREPARATION OF RESIN A

To a suitable reaction vessel equipped with a thermometer, mechanical stirrer, reflux condenser and inert gas inlet tube there were charged 2006.4 parts of propylene glycol, 2352.4 parts of maleic anhydride, and 0.01%, based on the total weight of the reaction mixture, of hydroquinone.

The reaction mixture, with carbon dioxide gas added through the inert gas inlet tube passing beneath its surface to provide an inert atmosphere, was slowly heated to 160° C. and held at that temperature for 20 hours, at which time the temperature was raised to 175° C. and held at that point for 3 hours. Heating was then discontinued, and the resulting reactive polyester resin, which had an acid number of 39.4 was cooled below 140° C. and discharged into a holding tank.

PREPARATION OF RESIN B

To a suitable reaction vessel, equipped in the same manner as the vessel used in the preparation of Resin A, there were charged 1505 parts of propylene glycol, 1588 parts of malaic anhydride, and 700 parts of hexachloroendomethylenetetrahydrophthalic acid.

The reaction mixture was slowly heated to 160° C. under an inert carbon dioxide atmosphere obtained as described hereinabove and held at that temperature for 20 hours. Heating was then discontinued and the resulting reactive polyester resin, which had an acid number of 28 and a chlorine content of 8%, based on total weight of reactive resin, was cooled below 140° C., admixed with 0.005%, based on total weight of reactive resin, of hydroquinone, and then discharged into a holding tank.

*Example I*

Seventy parts of Resin A, contained in a suitable reaction vessel, were heated over a steam bath until a fluidous melt was obtained. To this melt there were then added 30 parts of vinyl monochloroacetate and 6 parts of chloromethyl diallylphosphonate. The resulting mixture was heated over the steam bath until a homogeneous syrup was obtained and then cooled to room temperature, at which point 0.75%, based on the total weight of the thermosetting polyester resinous composition, of 2-hydroxy-4-methoxybenzophenone, a commercially available ultraviolet light-absorbing compound, was added to the cooled syrup.

*Example II*

Thermoset castings were prepared from the thermosetting polyester resinous composition of Example I in the following manner. One hundred parts of the product of Example I, catalyzed with 1% Luperco ATC (50% benzoyl peroxide–50% tricresylphosphate), were poured between two Herculite glass plates separated by a one-eighth inch thick rubber gasket. The catalyzed composition was then cured by subjecting it to a heating cycle of 8 hours at 125° F. followed by 6 hours at 125–250° F. and finally by 2 hours at 250° F.

*Examples III–XX*

The procedure of Example I was repeated to produce thermosetting polyester resinous compositions from the ingredients listed in the following table:

TABLE I

| Example | Reactive polyester resin | Parts | Cross-linking material | Parts | Percent UVC [1] |
|---|---|---|---|---|---|
| III | A | 70 | Vinyl β-monochloropropionate / CMDP [2] | 30 / 6 | 0.75 |
| IV | A | 70 | Vinyl α,β-dichloropropionate / CMDP | 30 / 6 | 0.75 |
| V | B | 70 | Vinyl monochloroacetate / CMDP | 30 / 6 | none |
| VI | B | 65 | Vinyl monochloroacetate / CMDP | 35 / 6 | none |
| VII | B | 60 | Vinyl monochloroacetate / CMDP | 40 / 6 | none |
| VIII | B | 70 | Vinyl monochloroacetate / Styrene / CMDP | 20 / 10 / 6 | none |
| IX | A | 70 | Vinyl monochloroacetate | 30 | 0.75 |
| X | A | 70 | Vinyl monochloroacetate [3] | 30 | 0.75 |
| XI | A | 70 | Vinyl monobromoacetate / CMDP | 30 / 6 | 0.75 |
| XII | A | 70 | Vinyl dichloroacetate | 30 | 0.75 |
| XIII | A | 70 | Vinyl dichloroacetate / CMDP | 30 / 6 | 0.75 |
| XIV | A | 70 | Vinyl difluorochloroacetate | 30 | 0.75 |
| XV | A | 70 | Vinyl trichloroacetate / CMDP | 30 / 6 | 0.75 |
| XVI | A | 70 | Vinyl β-monochloropropionate | 30 | 0.75 |
| XVII | A | 70 | Vinyl α,β-dichloropropionate | 30 | 0.75 |
| XVIII | A | 70 | Vinyl α,α,β-trichloropropionate | 30 | 0.75 |
| XIX | A | 70 | Vinyl α,α,β-trichloropropionate / CMDP | 30 / 6 | 0.75 |
| XX | B | 70 | Styrene | 30 | 0.75 |

[1] UVC—2-hydroxy-4-methoxybenzophenone.
[2] CMDP—chloromethyl diallylphosphonate.
[3] 6 parts of triethylphosphate added prior to cure.

*Example XXI*

Thermoset castings were prepared from the thermosetting polyester resinous compositions of Examples III to XX by the procedure of Example II above.

Standard 1/8 inch thick test specimens were cut from the castings prepared from the resinous compositions of Examples I, III, IV, IX to XIII and XV to XX and then tested for resistance to discoloration and degradation on exposure to ultraviolet light and accelerated weathering conditions. This test was carried out according to ASTM Standard D1499-59T using a Model DLTS Atlas Weather-Ometer which had been modified by replacing its carbon arc with a battery of alternating fluorescent ultraviolet sun lamps and black light lamps. The quantities measured and recorded in Table II below, namely percent change in reflectance of the polyester castings, measured at 430 millimicrons, indicate the degree of yellowing produced.

Test specimens measuring 5 inches in length by ½ inch in width by ⅛ inch in thickness were cut from the castings prepared from the resinous compositions of Examples I, III to VIII, XIII to XV, XIX and XX and then subjected to the burning rate test described in ASTM Standard D757-49. The results of these tests are also given in Table II below.

(5) Those containing chlorinated vinyl esters analogous to those used in the practice of the present invention together with chloromethyl diallylphosphonate (castings prepared from the resins of Examples XI, XIII, XV and XIX), and (6) The casting prepared from the resin of Example XX, which contains a halogen-containing reactive polyester resin together with a conventional monomeric cross-linking agent.

It can be seen from the evidence presented in Table II that although certain of the castings of groups 2 to 6 showed satisfactory flame-retardancy (a burning rate of less than about 0.35 inch per minute is considered acceptable), while others from these groups exhibited acceptable light-stability (a change in reflectance of less than about 10% on exposure for 1000 hours is considered acceptable), only castings from group 1, i.e., those prepared according to the practice of the present invention, were found to combine both of these desirable properties to an

TABLE II

| Casting from resin of Example— | Reactive polyester resin | Cross-linking material | Fluorescent Weather-Ometer data, percent change in reflectance | | Burning test data | |
|---|---|---|---|---|---|---|
| | | | 500 hours exposure | 1000 hours exposure | Burning rate [1] | Burning time [2] |
| I | A | Vinyl monochloroacetate / CMDP [3] | −1.3 | 1.2 | 0.17 | 88 |
| III | A | Vinyl β-monochloropropionate / CMDP | −1.0 | 0.8 | 0.20 | 123 |
| IV | A | Vinyl α,β-dichloropropionate / CMDP | 1.7 | 2.3 | 0.17 | 82 |
| V | B | Vinyl monochloroacetate / CMDP | | | 0.13 | 70 |
| VI | B | Vinyl monochloroacetate / CMDP | | | 0.15 | 62 |
| VII | B | Vinyl monochloroacetate / CMDP | | | 0.21 | 93 |
| VIII | B | Vinyl monochloroacetate / Styrene / CMDP | | | 0.30 | 115 |
| IX | A | Vinyl monochloroacetate | 6.2 | 13.6 | 0.52 | [6] 180 |
| X | A | Vinyl monochloroacetate [4] | | 15 | 0.22 | 112 |
| XI | A | Vinyl monobromoacetate / CMDP | 81.0 | ([5]) | | |
| XII | A | Vinyl dichloroacetate | 3.8 | 11.7 | | |
| XIII | A | Vinyl dichloroacetate / CMDP | 4.0 | 25.2 | 0.18 | 95 |
| XIV [7] | A | Vinyl difluorochloroacetate | | | 0.31 | 93 |
| XV | A | Vinyl trichloroacetate / CMDP | 75.0 | ([5]) | 0.26 | 82 |
| XVI | A | Vinyl β-monochloropropionate | 4.7 | 10.7 | 0.52 | [6] 180 |
| XVII | A | Vinyl α,β-dichloropropionate | 2.4 | 7.9 | 0.54 | [6] 180 |
| XVIII | A | Vinyl α,α,β-trichloropropionate | 9.7 | 27.5 | | |
| XIX | A | Vinyl α,α,β-trichloropropionate / CMDP | 12.2 | 36.3 | 0.18 | 83 |
| XX | B | Styrene | 12.9 | 13.3 | 0.54 | [6] 180 |

[1] In inches per minute.
[2] In seconds.
[3] CMDP—chloromethyl diallylphosphonate.
[4] 6 Parts of triethylphosphate added prior to cure.
[5] Not tested beyond 500 hours.
[6] Test discontinued at this point.
[7] Pale yellow casting; Barcol hardness—18-20, indicating unsatisfactory cure; discolored on aging.

The thermoset polyester resin castings compared in Table II may be divided, based on composition, into six distinct groups:

(1) Those containing both of the essential monomeric cross-linking agents of the present invention (castings prepared from the resins of Examples I and III to VIII).

(2) Those containing a chlorinated vinyl ester used in the practice of the present invention but no phosphorus-containing compound (castings prepared from the resins of Examples IX, XVI and XVII), (3) The casting containing a chlorinated vinyl ester used in the practice of the present invention together with a phosphorus-containing compound known in the art to impart flame-retardance to polyester resins (prepared from the resin of Example X), (4) Those containing chlorinated vinyl esters analogous to those used in the practice of the present invention but no phosphorus-containing compound (castings prepared from the resins of Examples XII, XIV and XVIII), acceptable extent. Furthermore, it can also be seen that many of the castings of groups 2 to 6 were found to be deficient in one or both of these properties.

The following example illustrates the preparation of a thermoset, glass cloth-reinforced laminate using a typical thermosetting polyester resinous composition prepared according to the practice of the present invention.

*Example XXII*

A piece of Owens-Corning T-19 glass cloth was placed on a sheet of cellophane of slightly larger length and width. A predetermined quantity of the thermosetting polyester resinous composition of Example V (containing 70 parts of Resin B, 30 parts of vinyl monochloroacetate and 6 parts of chloromethyl diallylphosphonate), catalyzed with 1% Luperco ATC, was then poured onto the cloth and spread out uniformly. This procedure was repeated with another layer of glass cloth and resin to give a 2-ply lay-up. Thereupon, the top surface of the lay-up was covered with a slightly longer and wider piece of cellophane, the covered lay-up was placed between two metal plates, and this assembly was then cured in a laminating press, under a pressure of 50 pounds per square inch, for 15 minutes at 105° C. The cured laminate was allowed to cool to room temperature and was then removed from the press and stripped of its cellophane sheets.

The cured laminate was then tested for self-extinguishability according to the procedure of ASTM Standard D635–56T, which involved holding the leading edge of the laminate in the flame of a Tyrell burner for one minute. Upon removal from the flame, the laminate immediately ceased burning. Thus, the laminate was considered to be self-extinguishing.

It will be obvious that other changes and variations may be made in carrying out the present invention without departing from the spirit and scope thereof as defined in the appended claims.

We claim:

1. A thermosetting polyester resinous composition capable of being cured in the presence of an organic superoxide polymerization catalyst to a substantially insoluble and infusible flame-retardant, self-extinguishing polyester resin having improved light-stability comprising a polymerizable mixture of (A) a reactive, ethylenically unsaturated polyester resin, prepared by reacting an $\alpha,\beta$-ethylenically unsaturated polycarboxylic acid and a polyhydric alcohol, and (B) an ethylenically unsaturated monomeric cross-linking material for said (A) comprising (1) from about 20% to about 50% by weight, based on the weight of said (A), of a vinyl ester of a 2 to 6 carbon atom-containing chlorinated saturated aliphatic mono-carboxylic acid corresponding to the general formula:

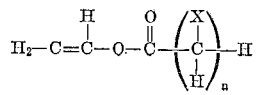

wherein X represents a member selected from the group consisting of hydrogen and chlorine, with at least one of the total number of substituents represented by X being chlorine, and $n$ is an integer of from 1 to 5, inclusive, and (2) from about 5% to about 10% by weight, based on the total weight of polymerizable reactants present, of chloromethyl diallylphosphonate.

2. A thermosetting polyester resinuous composition capable of being cured in the presence of an organic superoxide polymerization catalyst to a substantially insoluble and infusible flame-retardant, self-extinguishing polyester resin having improved light-stability comprising a polymerizable mixture of (A) a reactive, ethylenically unsaturated polyester resin, prepared by reacting an $\alpha,\beta$-ethylenically unsaturated polycarboxylic acid and a polyhydric alcohol, and (B) an ethylenically unsautrated monomeric cross-linking material for said (A) comprising (1) from about 20% to about 50% by weight, based on the weight of said (A), of vinyl monochloroacetate, and (2) from about 5% to about 10% by weight, based on the total weight of polymerizable reactants present, of chloromethyl diallylphosphonate.

3. A thermosetting polyester resinous composition capable of being cured in the presence of an organic superoxide polymerization catalyst to a substantially insoluble and infusible flame-retardant, self-extinguishing polyester resin having improved light-stability comprising a polymerizable mixture of (A) a reactive, ethylenically unsaturated polyester resin, prepared by reacting an $\alpha,\beta$-ethylenically unsaturated polycarboxylic acid and a polyhydric alcohol, and (B) an ethylenically unsaturated monomeric cross-linking material for said (A) comprising (1) from about 20% to about 50% by weight, based on the weight of said (A), of vinyl $\beta$-monochloropropionate, and (2) from about 5% to about 10% by weight, based on the total weight of polymerizable reactants present, of chloromethyl diallylphosphonate.

4. A thermosetting polyester resinous composition capable of being cured in the presence of an organic superoxide polymerization catalyst to a substantially insoluble and infusible flame-retardant, self-extinguishing polyester resin having improved light-stability comprising a polymerizable mixture of (A) a reactive, ethylenically unsaturated polyester resin, prepared by reacting an $\alpha,\beta$-ethylenically unsaturated polycarboxylic acid and a polyhydric alcohol, and (B) an ethylenically unsaturated monomeric cross-linking material for said (A) comprising (1) from about 20% to about 50% by weight, based on the weight of said (A), of vinyl $\alpha,\beta$-dichloropropionate, and (2) from about 5% to about 10% by weight, based on the total weight of polymerizable reactants present, of chloromethyl diallylphosphonate.

5. A thermosetting polyester resinous composition capable of being cured in the presence of an organic superoxide polymerization catalyst to a substantially insoluble and infusible flame-retardant, self-extinguishing polyester resin having improved light-stability comprising a polymerizable mixture of (A) a reactive, ethylenically unsaturated polyester resin, prepared by reacting an $\alpha,\beta$-ethylenically unsaturated polycarboxylic acid and a polyhydric alcohol, said (A) containing combined halogen in an amount which yields from about 5% to about 15% by weight, based on the total weight of polymerizable reactants present, of combined halogen in said substantially insoluble and infusible polyester resin, and (B) an ethylenically unsaturated monomeric cross-linking material for said (A) comprising (1) from about 20% to about 50% by weight, based on the weight of said (A), of a vinyl ester of a 2 to 6 carbon atom-containing chlorinated saturated aliphatic monocarboxylic acid corresponding to the general formula:

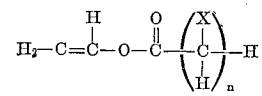

wherein X represents a member selected from the group consisting of hydrogen and chlorine, with at least one of the total number of substituents represented by X being chlorine, and $n$ is an integer of from 1 to 5, inclusive and (2) from about 5% to about 10% by weight, based on the total weight of polymerizable reactants present, of chloromethyl diallylphosphonate.

6. A thermosetting polyester resinous composition capable of being cured in the presence of an organic superoxide polymerization catalyst to a substantially insoluble and infusible flame-retardant, self-extinguishing polyester resin having improved light-stability comprising a polymerizable mixture of (A) a reactive, ethylenically unsaturated polyester resin, prepared by reacting an $\alpha,\beta$-ethylenically unsaturated polycarboxylic acid and a polyhydric alcohol, said (A) containing combined halogen in an amount which yields from about 5% to about 15% by weight, based on the total weight of polymerizable reactants present, of combined halogen in said substantially insoluble and infusible polyester resin, and (B) an ethylenically unsaturated monomeric cross-linking material for said (A) comprising (1) from about 20% to about 50% by weight, based on the weight of said (A), of vinyl monochloroacetate, and (2) from about 5% to about 10% by weight, based on the total weight of polymerizable reactants present, of chloromethyl diallylphosphonate.

7. A thermosetting polyester resinous composition capable of being cured in the presence of an organic superoxide polymerization catalyst to a substantially insoluble and infusible flame-retardant, self-extinguishing polyester resin having improved light-stability comprising a polymerizable mixture of (A) a reactive, ethylenically unsaturated polyester resin, prepared by reacting an $\alpha,\beta$-ethylenically unsaturated polycarboxylic acid and a polyhydric alcohol, said (A) containing combined halogen in an amount which yields from about 5% to about 15% by weight, based on the total weight of polymerizable reactants present, of combined halogen in said substantially insoluble and infusible polyester resin, and (B) an ethylenically unsaturated monomeric cross-linking material for said (A) comprising (1) from about 20% to about 50% by weight, based on the weight of said (A), of vinyl β-monochloropropionate, and (2) from about 5% to about 10% by weight, based on the total weight of polymerizable reactants present, of chloromethyl diallylphosphonate.

8. A thermosetting polyester resinous composition capable of being cured in the presence of an organic superoxide polymerization catalyst to a substantially insoluble and infusible flame-retardant, self-extinguishing polyester resin having improved light-stability comprising a polymerizable mixture of (A) a reactive, ethylenically unsaturated polyester resin, prepared by reacting an α,β-ethylenically unsaturated polycarboxylic acid and a polyhydric alcohol, said (A) containing combined halogen in an amount which yields from about 5% to about 15% by weight, based on the total weight of polymerizable reactants present, of combined halogen in said substantially insoluble and infusible polyester resin, and (B) an ethylenically unsaturated monomeric cross-linking material of said (A) comprising (1) from about 20% to about 50% by weight, based on the weight of said (A), of vinyl α,β-dichloropropionate, and (2) from about 5% to about 10% by weight, based on the total weight of polymerizable reactants present, of chloromethyl diallylphosphonate.

9. A thermosetting polyester resinous composition capable of being cured in the presence of an organic superoxide polymerization catalyst to a substantially insoluble and infusible flame-retardant, self-extinguishing polyester resin having improved light-stability comprising a polymerizable mixture of (A) a reactive, ethylenically unsaturated polyester resin, prepared by reacting an α,β-ethylenically unsaturated polycarboxylic acid and a polyhydric alcohol, (B) an ethylenically unsaturated monomeric cross-linking material for said (A) comprising (1) from about 20% to about 50% by weight, based on the weight of said (A), of a vinyl ester of a 2 to 6 carbon atom-containing chlorinated saturated aliphatic monocarboxylic acid corresponding to the general formula:

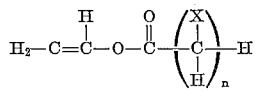

wherein X represents a member selected from the group consisting of hydrogen and chlorine, with at least one of the total number of substituents represented by X being chlorine, and n is an integer of from 1 to 5, inclusive, and (2) from about 5% to about 10% by weight, based on the total weight of polymerizable reactants present, of chloromethyl diallylphosphonate, and (C) from about 0.25% to about 1% by weight, based on the total weight of polymerizable reactants present, of an ultraviolet light-absorbing compound.

10. A thermosetting polyester resinous composition capable of being cured in the presence of an organic superoxide polymerization catalyst to a substantially insoluble and infusible flame-retardant, self-extinguishing polyester resin having improved light-stability comprising a polymerizable mixture of (A) a reactive, ethylenically unsaturated polyester resin, prepared by reacting an α,β-ethylenically unsaturated polycarboxylic acid and a polyhydric alcohol, said (A) containing combined halogen in an amount which yields from about 5% to about 15% by weight, based on the total weight of polymerizable reactants present, of combined halogen in said substantially insoluble and infusible polyester resin, (B) an ethylenically unsaturated monomeric cross-linking material for said (A) comprising (1) from about 20% to about 50% by weight, based on the weight of said (A), of a vinyl ester of a 2 to 6 carbon atom-containing chlorinated saturated aliphatic monocarboxylic acid corresponding to the general formula:

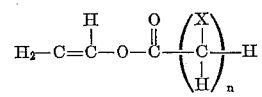

wherein X represents a member selected from the group consisting of hydrogen and chlorine, with at least one of the total number of substituents represented by X being chlorine, and n is an integer of from 1 to 5, inclusive, and (2) from about 5% to about 10% by weight, based on the total weight of polymerizable reactants present, of chloromethyl diallylphosphonate, and (C) from about 0.25% to about 1% by weight, based on the total weight of polymerizable reactants present, of an ultraviolet light-absorbing compound.

11. A substantially insoluble and infusible flame-retardant, self-extinguishing polyester resin having improved light-stability obtained by polymerizing a mixture comprising (A) a reactive, ethylenically unsaturated polyester resin, prepared by reacting an α,β-ethylenically unsaturated polycarboxylic acid and a polyhydric alcohol, and (B) an ethylenically unsaturated monomeric cross-linking material for said (A) comprising (1) from about 20% to about 50% by weight, based on the weight of said (A), of a vinyl ester of a 2 to 6 carbon atom-containing chlorinated saturated aliphatic monocarboxylic acid corresponding to the general formula:

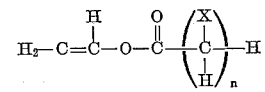

wherein X represents a member selected from the group consisting of hydrogen and chlorine, with at least one of the total number of substituents represented by X being chlorine, and n is an integer of from 1 to 5, inclusive, and (2) from about 5% to about 10% by weight, based on the total weight of polymerizable reactants present, of chloromethyl diallylphosphonate.

12. A substantially insoluble and infusible flame-retardant, self-extinguishing polyester resin having improved light-stability obtained by polymerizing a mixture comprising (A) a reactive, ethylenically unsaturated polyester resin, prepared by reacting an α,β-ethylenically unsaturated polycarboxylic acid and a polyhydric alcohol, and (B) an ethylenically unsaturated monomeric cross-linking material for said (A) comprising (1) from about 20% to about 50% by weight, based on the weight of said (A), of vinyl monochloroacetate, and (2) from about 5% to about 10% by weight, based on the total weight of polymerizable reactants present, of chloromethyl diallylphosphonate.

13. A substantially insoluble and infusible flame-retardant, self-extinguishing polyester resin having improved light-stability obtained by polymerizing a mixture comprising (A) a reactive, ethylenically unsaturated polyester resin, prepared by reacting an α,β-ethylenically unsaturated polycarboxylic acid and a polyhydric alcohol, and (B) an ethylenically unsaturated monomeric cross-linking material for said (A) comprising (1) from about 20% to about 50% by weight, based on the weight of said (A), of vinyl β-monochloropropionate, and (2) from about 5% to about 10% by weight, based on the total weight of polymerizable reactants present, of chloromethyl diallylphosphonate.

14. A substantially insoluble and infusible flame-retardant, self-extinguishing polyester resin having improved light-stability obtained by polymerizing a mixture comprising (A) a reactive, ethylenically unsaturated polyester resin, prepared by reacting an α,β-ethylenically unsaturated polycarboxylic acid and a polyhydric alcohol, and (B) an ethylenically unsaturated monomeric cross-linking material for said (A) comprising (1) from about 20% to about 50% by weight, based on the weight of said (A), of vinyl α,β-dichloropropionate, and (2) from about 5% to about 10% by weight, based on the total weight of polymerizable reactants present, of chloromethyl diallylphosphonate.

15. A substantially insoluble and infusible flame-retardant, self-extinguishing polyester resin having improved light-stability obtained by polymerizing a mixture comprising (A) a reactive, ethylenically unsaturated polyester resin, prepared by reacting an α,β-ethylenically unsaturated polycarboxylic acid and a polyhydric alcohol, said (A) containing combined halogen in an amount which yields from about 5% to about 15% by weight, based on the total weight of polymerizable reactants present, of combined halogen in said substantially insoluble and infusible polyester resin, and (B) an ethylenically unsaturated monomeric cross-linking material for said (A) comprising (1) from about 20% to about 50% by weight, based on the weight of said (A), of a vinyl ester of a 2 to 6 carbon atom-containing chlorinated saturated aliphatic monocarboxylic acid corresponding to the general formula:

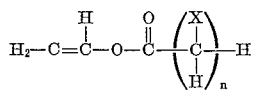

wherein X represents a member selected from the group consisting of hydrogen and chlorine, with at least one of the total number of substituents represented by X being chlorine, and n is an integer of from 1 to 5, inclusive, and (2) from about 5% to about 10% by weight, based on the total weight of polymerizable reactants present, of chloromethyl diallylphosphonate.

16. A substantially insoluble and infusible flame-retardant, self-extinguishing polyester resin having improved light-stability obtained by polymerizing a mixture comprising (A) a reactive, ethylenically unsaturated polyester resin, prepared by reacting an α,β-ethylenically unsaturated polycarboxylic acid and a polyhydric alcohol, said (A) containing combined halogen in an amount which yields from about 5% to about 15% by weight, based on the total weight of polymerizable reactants present, of combined halogen in said substantially insoluble and infusible polyester resin, and (B) an ethylenically unsaturated monomeric cross-linking material for said (A) comprising (1) from about 20% to about 50% by weight, based on the weight of said (A), of vinyl monochloroacetate, and (2) from about 5% to about 10% by weight, based on the total weight of polymerizable reactants present, of chloromethyl diallylphosphonate.

17. A substantially insoluble and infusible flame-retardant, self-extinguishing polyester resin having improved light-stability obtained by polymerizing a mixture comprising (A) a reactive, ethylenically unsaturated polyester resin, prepared by reacting an α,β-ethylenically unsaturated polycarboxylic acid and a polyhydric alcohol, said (A) containing combined halogen in an amount which yields from about 5% to about 15% by weight, based on the total weight of polymerizable reactants present, of combined halogen in said substantially insoluble and infusible polyester resin, and (B) an ethylenically unsaturated monomeric cross-linking material for said (A) comprising (1) from about 20% to about 50% by weight, based on the weight of said (A), of vinyl β-monochloropropionate, and (2) from about 5% to about 10% by weight, based on the total weight of polymerizable reactants present, of chloromethyl diallylphosphonate.

18. A substantially insoluble and infusible flame-retardant, self-extinguishing polyester resin having improved light-stability obtained by polymerizing a mixture comprising (A) a reactive, ethylenically unsaturated polyester resin, prepared by reacting an α,β-ethylenically unsaturated polycarboxylic acid and a polyhydric alcohol, said (A) containing combined halogen in an amount which yields from about 5% to about 15% by weight, based on the total weight of polymerizable reactants present, of combined halogen in said substantially insoluble and infusible polyester resin, and (B) an ethylenically unsaturated monomeric cross-linking material for said (A) comprising (1) from about 20% to about 50% by weight, based on the weight of said (A), of vinyl α,β-dichloroproprionate, and (2) from about 5% to about 10% by weight, based on the total weight of polymerizable reactants present, of chloromethyl diallylphosphonate.

19. A substantially insoluble and infusible flame-retardant, self-extinguishing polyester resin having improved light-stability obtained by polymerizing a mixture comprising (A) a reactive, ethylenically unsaturated polyester resin, prepared by reacting an α,β-ethylenically unsaturated polycarboxylic acid and a polyhydric alcohol, (B) an ethylenically unsaturated monomeric cross-linking material for said (A) comprising (1) from about 20% to about 50% by weight, based on the weight of said (A), of a vinyl ester of a 2 to 6 carbon atom-containing chlorinated saturated aliphatic monocarboxylic acid corresponding to the general formula:

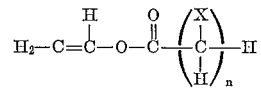

wherein X represents a member selected from the group consisting of hydrogen and chlorine, with at least one of the total number of substituents represented by X being chlorine, and n is an integer of from 1 to 5, inclusive, and (2) from about 5% to about 10% by weight, based on the total weight of polymerizable reactants present, of chloromethyl diallylphosphonate, and (C) from about 0.25% to about 1% by weight, based on the total weight of polymerizable reactants present, of an ultraviolet light-absorbing compound.

20. A substantially insoluble and infusible flame-retardant, self-extinguishing polyester resin having improved light-stability obtained by polymerizing a mixture comprising (A) a reactive, ethylenically unsaturated polyester resin, prepared by reacting an α,β-ethylenically unsaturated polycarboxylic acid and a polyhydric alcohol, said (A) containing combined halogen in an amount which yields from about 5% to about 15% by weight, based on the total weight of polymerizable reactants present, of combined halogen in said substantially insoluble and infusible polyester resin, (B) an ethylenically unsaturated monomeric cross-linking material for said (A) comprising (1) from about 20% to about 50% by weight, based on the weight of said (A), of a vinyl ester of a 2 to 6 carbon atom-containing chlorinated saturated aliphatic monocarboxylic acid corresponding to the general formula:

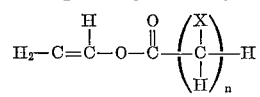

wherein X represents a member selected from the group consisting of hydrogen and chlorine, with at least one of the total number of substituents represented by X being chlorine, and n is an integer of from 1 to 5, inclusive, and (2) from about 5% to about 10% by weight, based on the total weight of polymerizable reactants present, of chloromethyl diallylphosphonate, and (C) from about 0.25% to about 1% by weight, based on the total weight of polymerizable reactants present, of an ultraviolet light-absorbing compound.

References Cited by the Examiner
UNITED STATES PATENTS

| | | | |
|---|---|---|---|
| 2,714,100 | 7/55 | Toy et al. | 260—80 |
| 2,822,340 | 2/58 | McGovern et al. | 260—870 |
| 2,931,746 | 4/60 | Robitschek et al. | 260—869 |
| 2,991,269 | 7/61 | Nozaki | 260—875 |

MURRAY TILLMAN, *Primary Examiner.*

WILLIAM H. SHORT, *Examiner.*

UNITED STATES PATENT OFFICE
CERTIFICATE OF CORRECTION

Patent No. 3,210,442                           October 5, 1965

Lennart A. Lundberg et al.

It is hereby certified that error appears in the above numbered patent requiring correction and that the said Letters Patent should read as corrected below.

Column 2, line 34, for "realtively" read -- relatively --; line 51, for "self-extinguisher" read -- self-extinguishability --; column 3, line 4, for "melery" read -- merely --; line 31, for "finding" read -- findings --; column 9, line 62, for "polyesters" read -- polyester --; column 11, line 21, for "set", first occurrence, read -- so --; column 12, line 8, for "0.005%" read -- 0.0056% --; column 13, line 6, and columns 13 and 14, Table II, in the heading to the fourth column, for "Weather-Ometer", each occurrence, read -- Weather-O-meter --; column 15, line 54, for "unsautrated" read -- unsaturated --; column 17, line 25, for "of" read -- for --; column 20, line 6, for "α,β-dichloroproprionate" read -- α,β-dichloropropionate --.

Signed and sealed this 7th day of June 1966.

(SEAL)
Attest:

ERNEST W. SWIDER                              EDWARD J. BRENNER
Attesting Officer                           Commissioner of Patents